United States Patent
Goodier et al.

(10) Patent No.: US 10,690,026 B2
(45) Date of Patent: Jun. 23, 2020

(54) FLUID SYSTEM

(71) Applicant: Castrol Limited, Pangbourne, Reading (GB)

(72) Inventors: Steven Paul Goodier, Moulsford (GB); Oliver Paul Taylor, Reading (GB); Peter Stuart Brett, Reading (GB); Mike Fairs, Royston (GB); Piers Sebastian Harding, Royston (GB); Christopher Dawson, Royston (GB)

(73) Assignee: Castrol Limited, Reading (GB)

( * ) Notice: Subject to any disclaimer, the term of this patent is extended or adjusted under 35 U.S.C. 154(b) by 0 days.

(21) Appl. No.: 16/403,524

(22) Filed: May 4, 2019

(65) Prior Publication Data

US 2019/0257229 A1   Aug. 22, 2019

Related U.S. Application Data

(63) Continuation of application No. 15/762,419, filed as application No. PCT/EP2016/072768 on Sep. 23, 2016.

(30) Foreign Application Priority Data

Sep. 23, 2015 (GB) .................................. 1516854.5

(51) Int. Cl.
*F01M 11/04* (2006.01)
*B60K 11/02* (2006.01)
(Continued)

(52) U.S. Cl.
CPC .............. *F01M 11/04* (2013.01); *B60K 11/02* (2013.01); *B60S 1/50* (2013.01); *B60T 17/06* (2013.01); *F01M 2011/0483* (2013.01)

(58) Field of Classification Search
CPC .. B67D 3/0032; B67D 3/0029; B67D 7/0288; B65D 25/2858; B65D 25/2852;
(Continued)

(56) References Cited

U.S. PATENT DOCUMENTS 2,103,063 A   12/1937   Clark
3,972,387 A    8/1976   Braun
(Continued)

FOREIGN PATENT DOCUMENTS

CN   CA 1354319     6/2006
CN   CA 101903076  12/2010
(Continued)

*Primary Examiner* — Timothy P. Kelly
(74) *Attorney, Agent, or Firm* — McDonnell Boehnen Hulbert & Berghoff LLP

(57) ABSTRACT

A replaceable fluid container for an engine or a vehicle, comprising: a fluid reservoir, at least one fluid port adapted to couple with a fluid circulation system; and an actuator, configured to be operated between a first condition and a second condition, wherein the actuator is configured, in the first condition, to enable the fluid container to be inserted into and/or held in a dock, in a seated but undocked condition, and inhibit docking of the fluid container to the dock; and wherein the actuator is further configured, when operated from the first condition to the second condition with the fluid container being in the seated but undocked condition, to enable the fluid container to dock in an engaged condition with the dock, associated docks and associated methods of supplying a fluid to a vehicle or an engine and of decoupling a fluid container from a fluid circulation system of a vehicle or an engine.

24 Claims, 10 Drawing Sheets

(51) Int. Cl.
*B60S 1/50* (2006.01)
*B60T 17/06* (2006.01)

(58) Field of Classification Search
CPC .............. F16N 19/00; B01D 2201/291; B01D 2201/305; B01D 2201/4061; F01M 11/03; F01M 2011/031; F01M 2011/0483; F01M 11/04

See application file for complete search history.

(56) References Cited

U.S. PATENT DOCUMENTS

| | | | |
|---|---|---|---|
| 4,075,099 A | 2/1978 | Pelton et al. | |
| 4,151,823 A | 5/1979 | Grosse et al. | |
| 4,676,287 A * | 6/1987 | Fitzwater | A47L 11/30 |
| | | | 141/285 |
| 5,454,354 A | 10/1995 | Miller | |
| 5,476,390 A | 12/1995 | Taguchi et al. | |
| 6,048,454 A | 4/2000 | Jenkins | |
| 9,869,219 B2 | 1/2018 | Barnes et al. | |
| 9,878,822 B2 | 1/2018 | Barnes et al. | |
| 9,890,901 B2 | 2/2018 | Brett et al. | |
| 9,938,867 B2 | 4/2018 | Brett et al. | |
| 2007/0132819 A1 | 6/2007 | Umeda et al. | |
| 2011/0232785 A1 | 9/2011 | Takahashi | |
| 2011/0253092 A1 | 10/2011 | Springer et al. | |
| 2014/0291317 A1 | 10/2014 | Lai et al. | |
| 2015/0001140 A1 | 1/2015 | Reckin et al. | |
| 2015/0191156 A1 | 7/2015 | Kiser | |
| 2015/0291317 A1 | 10/2015 | Brett et al. | |
| 2015/0292372 A1 | 10/2015 | Barnes et al. | |
| 2015/0292674 A1 | 10/2015 | Brett et al. | |
| 2017/0089234 A1 | 3/2017 | Dawson et al. | |
| 2017/0089235 A1 | 3/2017 | Dawson et al. | |
| 2017/0089236 A1 | 3/2017 | Andersen et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 | 6/2017 | Barnes et al. | |
| 2017/0190466 A1 | 7/2017 | Andersen et al. | |
| 2017/0197596 A1 | 7/2017 | Barnes et al. | |
| 2018/0258805 A1 | 9/2018 | Goodier et al. | |
| 2018/0258806 A1 | 9/2018 | Butterworth et al. | |
| 2018/0266873 A1 | 9/2018 | Goodier et al. | |
| 2018/0274408 A1 | 9/2018 | Goodier et al. | |

FOREIGN PATENT DOCUMENTS

| | | |
|---|---|---|
| DE | 10 2006 005529 | 8/2007 |
| DE | 102012024365 | 6/2014 |
| EP | 1 352748 | 10/2003 |
| FR | 2 803 872 | 7/2001 |
| JP | S54 42140 | 3/1979 |
| JP | S55 94624 | 7/1980 |
| JP | H11-028319 | 2/1999 |
| JP | 2002-212974 | 7/2002 |
| JP | 2003 042433 | 2/2003 |
| JP | 2006-242160 | 9/2006 |
| JP | 2010-282614 | 12/2010 |
| JP | 2011-085251 | 4/2011 |
| WO | WO 2001/53663 | 7/2001 |
| WO | WO 2003/106598 | 12/2003 |
| WO | WO 2014/076316 | 4/2014 |
| WO | WO 2015/177318 | 11/2015 |
| WO | WO 2016/158971 | 10/2016 |

* cited by examiner

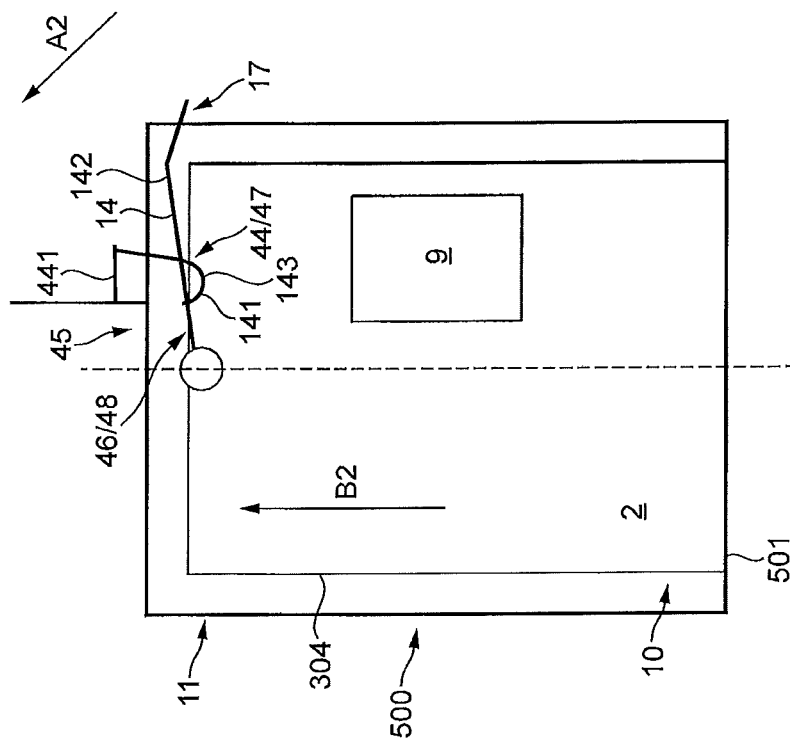
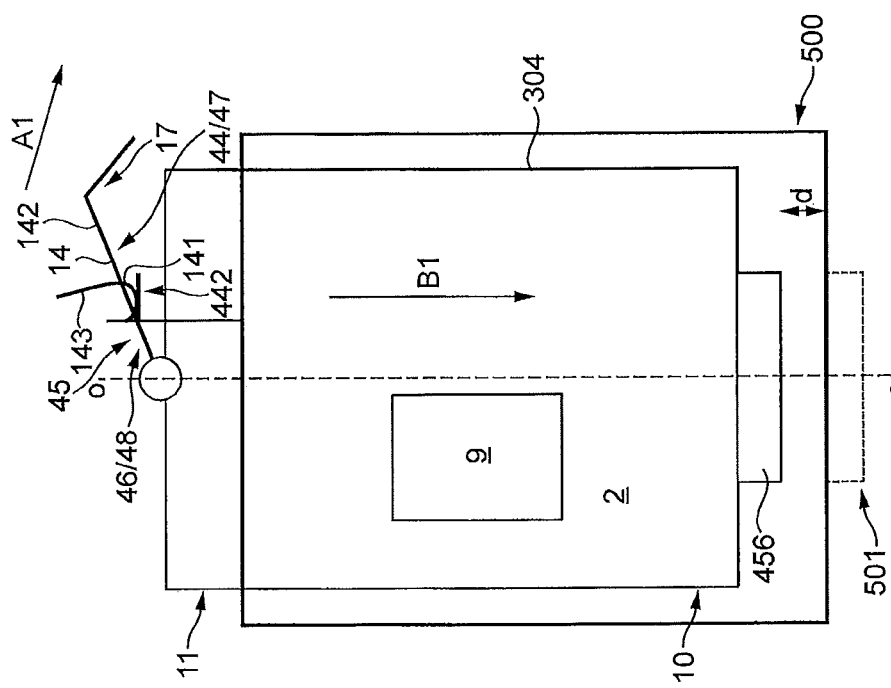

FLUID SYSTEM

CROSS REFERENCE TO RELATED APPLICATIONS

This application is a continuation of U.S. patent application Ser. No. 15/762,419, filed Mar. 22, 2018, which is a National Phase application of, and claims the benefit of, International (PCT) Application No. PCT/EP2016/072768, filed Sep. 23, 2016, which claims priority to GB Patent Application No. 1516854.5, filed Sep. 23, 2015, each of which is hereby incorporated by reference in its entirety.

This invention relates to a fluid container, a dock, a system and corresponding methods, and in particular to a replaceable fluid container for an engine or a vehicle, a dock for the container, a system, a method of supplying fluid to a vehicle engine or a vehicle, and a method of decoupling a fluid container from a fluid circulation system or a vehicle.

Many vehicle engines use one or more fluids for their operation. Such fluids are often liquids. For example, internal combustion engines use liquid lubricating oil. Also, electric engines use fluids which can provide heat exchange functionality, for example to cool the engine and/or to heat the engine, and/or to cool and heat the engine during different operating conditions. The heat exchange functionality of the fluids may be provided, in addition to other functions (such as a primary function) which may include for example charge conduction and/or electrical connectivity. Such fluids are generally held in reservoirs associated with the engine and may require periodic replacement.

Conventional periodic replacement of engine lubricating oil in a vehicle engine usually involves draining the oil from the engine sump. The process may also involve removing and replacing the engine oil filter. Such a procedure usually requires access to the engine sump drain plug and oil filter from the underside of the engine, may require the use of hand tools, and usually requires a suitable collection method for the drained lubricating oil. This is complex and expensive.

Aspects of the disclosure address or at least ameliorate at least one of the above issues.

Aspects of the presort disclosure are recited in the independent claims. Optional features are recited in the dependent claims.

The disclosure extends to:
a dock configured to cooperate with a container of any aspect of the disclosure, and/or
a system comprising a dock of any aspect of the disclosure and a replaceable fluid container configured to cooperate with a dock of any aspect of the disclosure, and/or
a method of supplying a fluid to a vehicle or an engine, and/or
a method, of decoupling a fluid container from a fluid circulation system of a vehicle or an engine.

Any feature in one aspect of the disclosure may be applied to other aspects of the disclosure, in any appropriate combination. In particular, features of method aspects may be applied to containers and/or docks and/or systems aspects, and vice versa.

Embodiments will now be described, by way of example only, with reference to the accompanying drawings, in which:

FIG. 2A shows a schematic illustration of an example fastening and/or guiding mechanism of a container with an actuator in a first condition;

FIG. 2B shows a schematic illustration of an example fastening and/or guiding mechanism of a container with an actuator in a second condition;

Figure 8B:
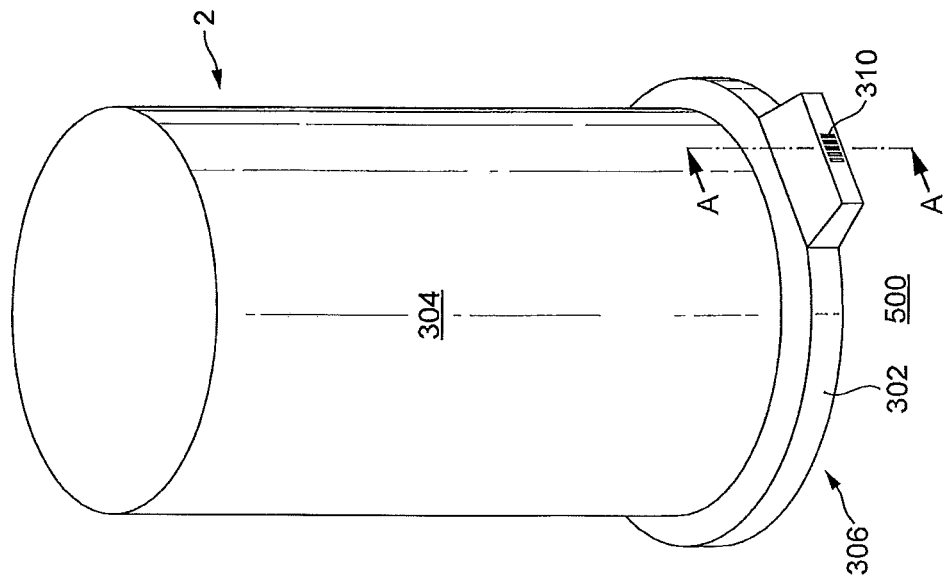
Figure 8A:
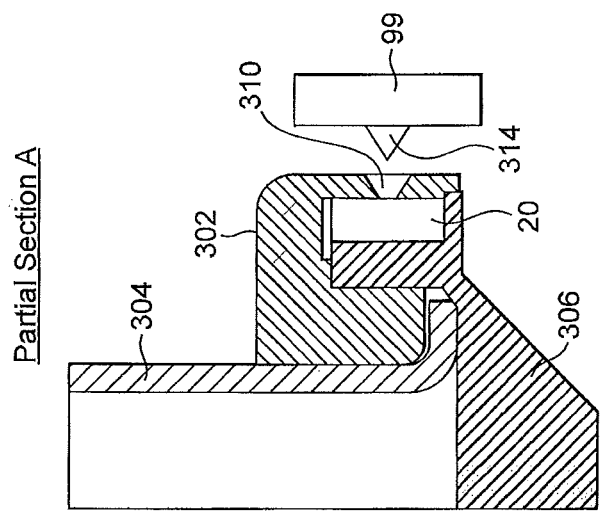
Figure 9A:
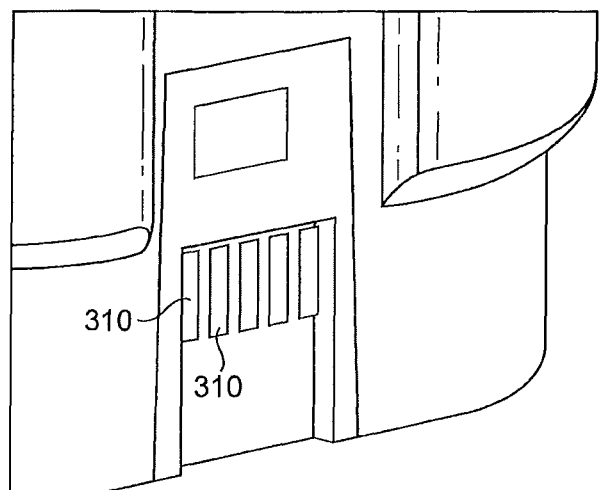
Figure 9B:
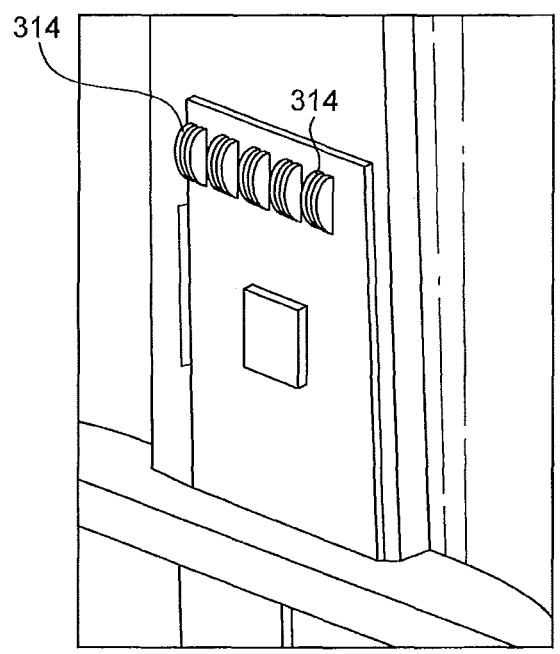

FIGS. 8A and 8B respectively show, in schematic elevation view, a replaceable fluid container for an engine or a vehicle, and a partial section through a wall of the container; and FIGS. 9A and 9B show, in schematic elevation view, connections for a fluid container and for a dock, respectively.

Figure 1B:
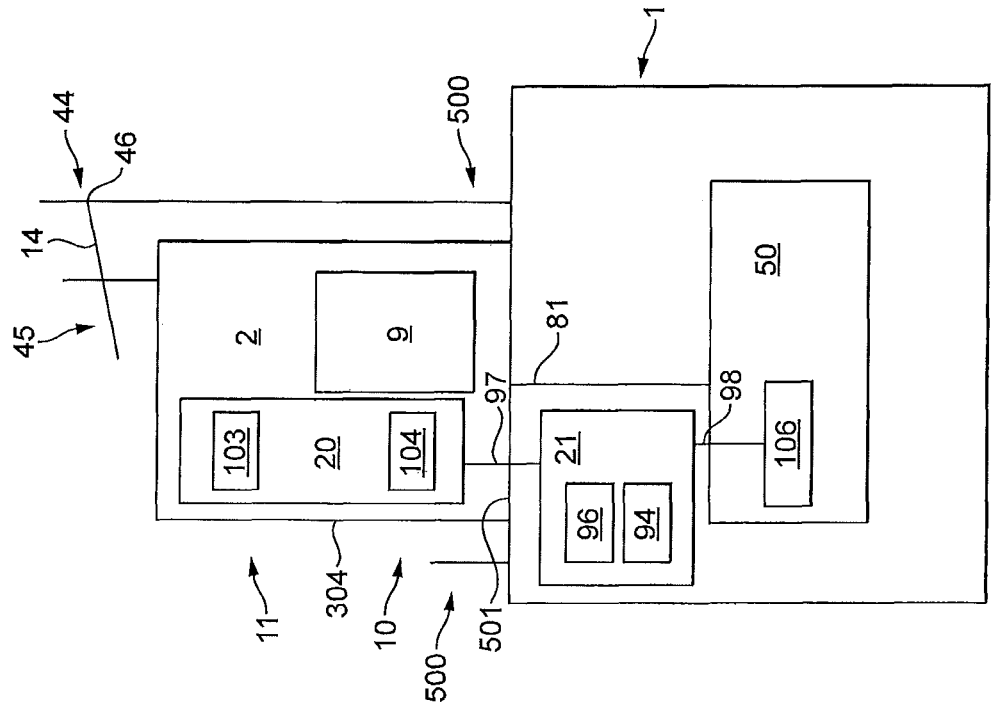
FIG. 1B shows a schematic illustration of an example dock and an example replaceable fluid container, the example container being shown in an engaged condition.
Figure 1A:
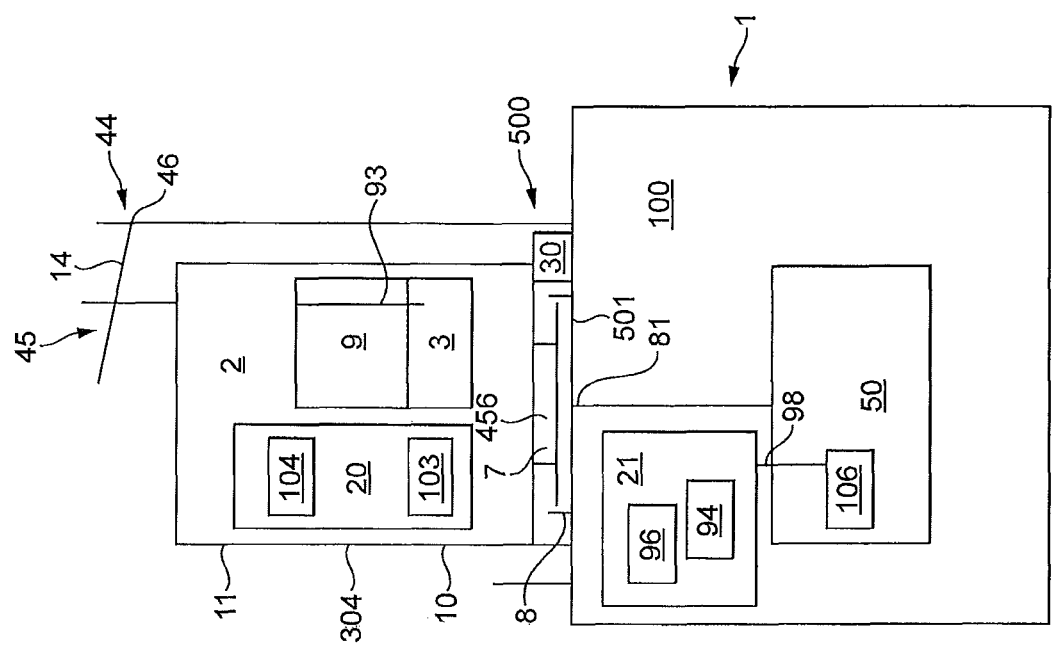
FIG. 1A shows a schematic illustration of an example dock and an example replaceable fluid container, the example container being shown in a seated but undocked condition.

In the drawings, like reference numerals are used to indicate like elements. FIG. 1A and FIG. 1B schematically illustrate a replaceable fluid container 2 and a dock 500 for the replaceable fluid container 2, the container 2 being for example for providing fluid to an engine 50 or a vehicle 100.

In the present disclosure, and as explained in further detail below, "replaceable" means that:
the container can be supplied foil with fresh and/or unused fluid, and/or the container can be inserted and/or seated and/ox docked in the dock, in a non-destructive manner, and/or
the container can be coupled to the fluid circulation system, in a non-destructive manner, and/or
the container can be removed from the dock, in a non-destructive manner, i.e. in a manner which enables its re-insertion should that be desired, and/or
the same (for example after having been refilled) or another (for example full and/or new) container can be re-inserted and/or re-seated and/or re-docked in the dock, in a non-destructive manner.

It is understood that the term "replaceable" means that the container may be "removed" and/or "replaced" by another new container and/or the same container after having been refilled (in other words the replaceable container may be "refillable") which may be re-inserted in the dock or re-coupled to the fluid circulation system.

In the present disclosure, "in a non-destructive manner" means that integrity of the container is not altered, except maybe for breakage and/or destruction of seals (such as seals on fluid ports) or of other disposable elements of the container.

The engine 50 may be for example an engine of a vehicle 100. The fluid container 2, described in more detail below, comprises a body 304 comprising a first, further from the dock, part 11 and a second, closer to the dock, part 10. The container 2 also comprises at least one fluid port 456 provided in the second part 10. As shown in FIG. 1A, in some examples the port 456 may comprise a coupling 7 adapted to connect, as shown in FIG. 1B, to a corresponding port 81 (for example comprising a coupling 8 for example shown in FIG. 1A) on the vehicle 100.

As will be explained in greater detail below, the container 2 may comprise for example two, three or four (or more) fluid ports (such as inlet, outlet or vent ports). The connection between the port 456 and the port 81 is configured to connect the fluid container 2 in fluidic communication with a fluid circulation system 1 of the engine 50 or the vehicle 100.

In the examples illustrated in FIGS. 1A and 2A, the port 456 is shown as being a male element and the port 81 as a female element. It should be understood that the port 456 may be a female element and the port 81 as a male element, as explained in reference to FIG. 6 and FIG. 7.

In some non-limiting examples, the fluid container 2 may also comprise a data provider 20 arranged for data communication with a control device 21 of the vehicle 100 when the container 2 is engaged with the dock 500 (FIG. 1B). The data provider 20 is described in greater detail below.

In some examples, the fluid container 2 comprises a reservoir 9 for holding a fluid 3. In some examples, the reservoir may be a specific chamber or the fluid may simply be held in the container. The reservoir 9 of the container 2 may be pre-filled with the fluid 3 before the container 2 is inserted in the dock 500.

The fluid 3 may be any type of fluid circulated in the engine 50 and/or circulated in any fluid circulation system associated with the engine 50 (that is the fluid is not necessarily circulated in the engine 50) to support a function of the engine 50 and/or the vehicle 100. The function may be an ancillary function of the engine 50. For example the fluid 3 may be lubricant, and/or coolant, and/or de-icer, and/or any hydraulic fluid such as a fluid used in braking systems, and/or a pneumatic fluid, a washer fluid, a fuel additive or any other fluid associated with any function of the engine and/or the vehicle. Many different types and grades of such fluid are available. As already mentioned, in some non-limiting examples, the fluid 3 may be an engine lubricating oil or an engine heat exchange fluid.

As illustrated in FIGS. 1A and 2A, in a seated but undocked condition, the container 2 may be easily seated in the dock 500 and/or removed from the dock 500 by a user and/or operator. In the seated by undocked condition the container is disengaged (also referred to as "undocked" or "disconnected") from the dock 500.

To that effect, the container 2 comprises an actuator 45 configured to be operated between a first condition and a second condition.

As illustrated in FIGS. 1A and 2A, the actuator 45 is configured, in the first condition, to enable the container 2 to be inserted into and/or held in the dock 500 in the seated but undocked condition. In the seated but undocked condition, the container 2 may be easily removed from the dock 500 by a user and/or operator.

In some examples, the actuator may comprise a container fastening mechanism 46 configured to cooperate with a dock fastening mechanism 44 of the dock 500. The actuator 45 may be configured such that, in the first condition, the fastening mechanism 46 of the actuator 45 is configured to abut with the fastening mechanism 44 of the dock 500 to hold the fluid container 2 such that the container 2 is in the seated but undocked condition. In such an example, the port 456 of the container 2 is not docked in the dock 500 (FIG. 1A). In some examples, in the seated but undocked condition of the container 2 with the actuator 45 being in the first condition, the fastening mechanism 46 and/or the fastening mechanism 44 are configured to hold the fluid container 2 such that the container 2 is maintained in the seated but undocked condition. In such an example, the container is not docked with a docking interface 501 of the dock 500. For example, in the seated but undocked condition, the container 2 and the docking interface 501 are not fastened to each other, for instance the container 2 and the docking interface 501 may be just touching or be spaced from each other.

When the actuator is in the first condition with the container 2 being in the seated but undocked condition, the actuator 45 of the container may thus enable easy insertion of the container 2 into and/or removal of the container 2 from the dock 500. In some examples, insertion of the container 2 into and/or removal of the container 2 from the dock 500, in the seated but undocked condition, may be performed without the use by a user and/or operator of specific and/or additional tools. In some examples, insertion of the container 2 into and/or removal of the container 2 from the dock 500, in the seated but undocked condition, may be performed with a single hand by the user and/or operator.

As explained in greater detail below, the actuator is configured, in the first condition, to inhibit docking of the fluid container to the dock when the container is in the seated but undocked condition. As explained in greater detail below, the actuator has to be operated from the first condition to the second condition to enable docking of the container in the dock.

The actuator is further configured, when operated from the first condition to the second condition with the container being in the seated but undocked condition, to enable the fluid, container to dock in an engaged condition with the dock (FIG. 1B).

In some examples, the actuator 45 may be configured such that, in the second condition, the fastening mechanism 46 of the actuator 45 is fastened to the fastening mechanism 44 of the dock 500, and the port 456 of the container 2 is in the engaged condition (also referred to as a "docked" or "connected" condition). In some examples, in the engaged condition of the container 2 with the actuator 45 being in the second condition, the fastening mechanism 46 and/or the fastening mechanism 44 are configured to hold the fluid container 2 in the docked condition with the docking interface 501 of the dock 500. In the second condition of the actuator 45, the fastening mechanism 46 of the actuator 45 may be fastened to the fastening mechanism 44 of the dock 500, for example using cooperating fastening mechanisms, such as latches, on the container 2 and/or on the dock 500, such as resilient and/or biased mechanisms cooperating and/or interlocking with conforming and/or cooperating mechanisms, such as indents and/or grooves.

In some non-limiting examples, the actuator 45 may further act as a locking mechanism, as explained hi greater detail below. In the engaged condition of the container 2 with the actuator 45 being in the second condition, the container 2 cannot be easily removed from the dock 500 by a user and/or operator.

As a result, in the second condition of the actuator 45 with the container in the engaged condition, the container 2 cannot be removed in a non-destructive manner from the dock 500. The actuator 45 needs to be in the first condition to enable the container 2 to be easily removed from the dock 500 in a manner which enables its re-insertion should that be desired.

In the docked condition of the container 2, the connection between the port 456 and the port 81 may be configured to connect the fluid container 2 in fluidic communication with a fluid circulation system 1 of the engine 50.

In some non-limiting examples, in the engaged condition of the container 2, the data provider 20 may be arranged for data communication with the control device 21.

As schematically illustrated in FIG. 2A and FIG. 2B, the actuator 45 may be configured to be operated between the first condition (FIG. 2A) and the second condition (FIG. 2B).

In some examples, the actuator 45 is configured, as the actuator 45 is operated from the first condition (FIG. 2A) to the second condition (FIG. 2B) with the container being in the seated but undocked condition, to insert the container 2 further into the dock 500. In some examples, the actuator 45 may be configured to enable the fluid container to dock in the engaged condition with the dock as the actuator 45 is operated to the second condition. In some examples, the actuator 45 may further be configured, as the actuator 45 is operated from the second condition (FIG. 2B) to the first condition (FIG. 2B), to extract the container 2 from the dock 500 to take the fluid container from the engaged condition into the seated but undocked condition. In some examples, the fluid container 2 may be extracted from the engaged condition to the seated but undocked condition, as the actuator 45 is operated to the first condition.

In some examples, operation of the actuator 45 between the first condition and the second condition and/or between the second condition and the first condition may be performed without the use by a user and/or operator of specific and/or additional tools. In some examples, the operation of the actuator 45 between the first condition and the second condition and/or between the second condition and the first condition may be performed with a single hand by the user and/or operator.

In some examples, the actuator 45 may comprise at least one lever 14. The lever 14 may comprise any type of fastening arm connected with the body 304 of the container 2. As a non-limiting example, the lever 14 may comprise at least one arm 142, mounted to be able to rotate with respect to the body 304.

In some examples, the fastening mechanism 46 of the actuator 45 may be provided on the lever 14. The fastening mechanism 46 may comprise for example at least one cam 141 provided on the rotatable arm 142. The fastening mechanism 46 may comprise a fastening mechanism engaging surface 143 configured to cooperate with the fastening mechanism 44 of the dock 500. The surface 143 may be any type of cooperating surface. As a non-limiting example, the surface 143 may comprise a spigot-engaging surface 143 provided on the lever 14, such as a mechanism groove 143 provided on the lever 14.

The fastening mechanism 44 of the dock 500 may comprise a lever-engaging surface 442 configured to cooperate with the mechanism 46 provided on the lever 14. In some examples, the surface 442 may be configured to cooperate with the cam 141 provided on the lever 14 and/or the fastening mechanism engaging surface 143 provided on the lever 14. The lever-engaging surface 442 may be any type of cooperating surface. As a non-limiting example, the lever-engaging surface 442 may comprise a spigot 441 provided on the dock.

As schematically illustrated by FIG. 2A, in the first condition of the actuator 45 with containers being in the seated but undocked condition, the mechanism 46 of the actuator 45 is configured to abut with the fastening mechanism 44 of the dock 500, to hold the fluid containers such that the port 456 of the container 2 is not docked with the dock 500. In some examples, in the first condition of the actuator, the cam 141 provided on the arm 142 of the lever 14 of the actuator 45 is configured to abut with the spigot 441 of the fastening mechanism 44 of the dock 500, to hold the fluid container 2 such that the port 456 of the container 2 is not docked in the dock 500.

As schematically illustrated by FIGS. 2A and 2B, the actuator 45 is configured to be movable (as shown by arrow A1) with respect to the body 304, in order to guide the fluid container 2 from the seated but undocked condition (FIG. 2A) into the engaged condition (FIG. 2B).

As a non-limiting example, the movement of the actuator 45 from the first condition to the second condition may cause the arm 142 to rotate with respect to the body 304. The rotation of the arm 142 causes the surface 143 which cooperates with the spigot 441 to displace the container 2 toward the dock 500, to engage the container 2 with the dock 500 (for example the docking interface 501).

Additionally or alternatively, in some examples, the actuator 45 may be configured to be movable (as shown by arrow A2) with respect to the body 304 in order to guide the fluid container 2 from the engaged condition (FIG. 2B) to the seated but undocked condition (FIG. 2A).

As a non-limiting example, the movement of the actuator 45 from the second condition to the first condition causes the arm 142 to rotate with respect to the body 304. The rotation of the arm 142 causes the surface 143 configured to cooperate with the spigot 441 to displace the container 2 further from the dock 500, to disengage the container 2 from the dock 500 (for example the docking interface 501).

In some examples, the actuator 45 is configured to guide the fluid container 2 from the scaled but undocked condition (FIG. 2A) to the engaged condition (FIG. 2B) in a direction normal to the port 456 (for example which defines, in use, a direction of flow of fluid in the container) and/or normal to the docking interface 501 of the dock 500. To that effect, the actuator 45 may comprise a container guiding mechanism 48 configured to control engagement (such as control of the rate and of the engagement force) of the fluid container 2 with the dock 500 from the seated but undocked condition to the engaged condition.

Additionally or alternatively, the actuator 45 may be configured to guide the fluid container 2 from the engaged condition (FIG. 2B) to the seated but undocked condition (FIG. 2A) in a direction normal to the port 456 and/or normal to the docking interface 501 of the dock 500. To that effect, the container guiding mechanism 48 may be configured to control disengagement (such as control of the rate and of engagement force) of the fluid container 2 from the dock 500 from the engaged condition to the seated but undocked condition.

A dock guiding mechanism 47 is provided on the dock 500, as explained in further detail below.

The fastening mechanism 46 and/or container guiding mechanism 48 of the actuator 45 may thus enable displacement of the container 2 with respect to the dock 500, for example in a direction normal to the port 456 and/or normal to the docking interface 501. The displacement of the container 2 with respect to the dock 500 may enable correct coupling of the fluid port 456 of the container 2, therefore avoiding undesirable leakage of the container 2. The displacement of the container 2 with respect to the dock 500 may enable simultaneous coupling of the fluid ports of the container 2, therefore avoiding undesirable leakage of the container 2.

Figure 4A:
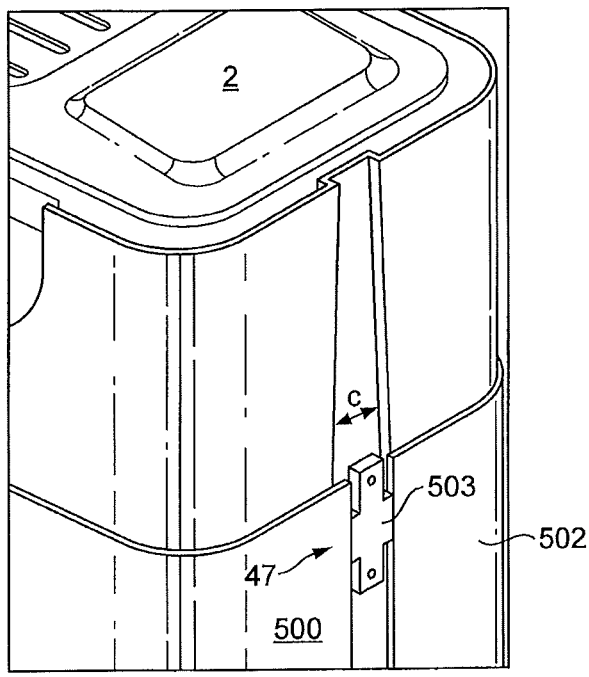
FIGS. 4A and 4B illustrate an example of tapered geometry of an engaging mechanism of the dock and/or container.
Figure 4B:
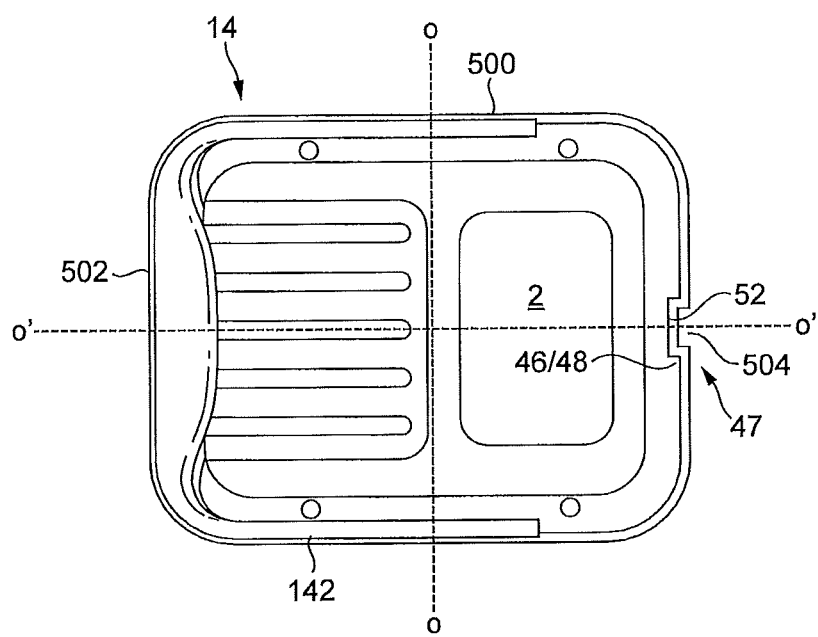
Figure 5A:
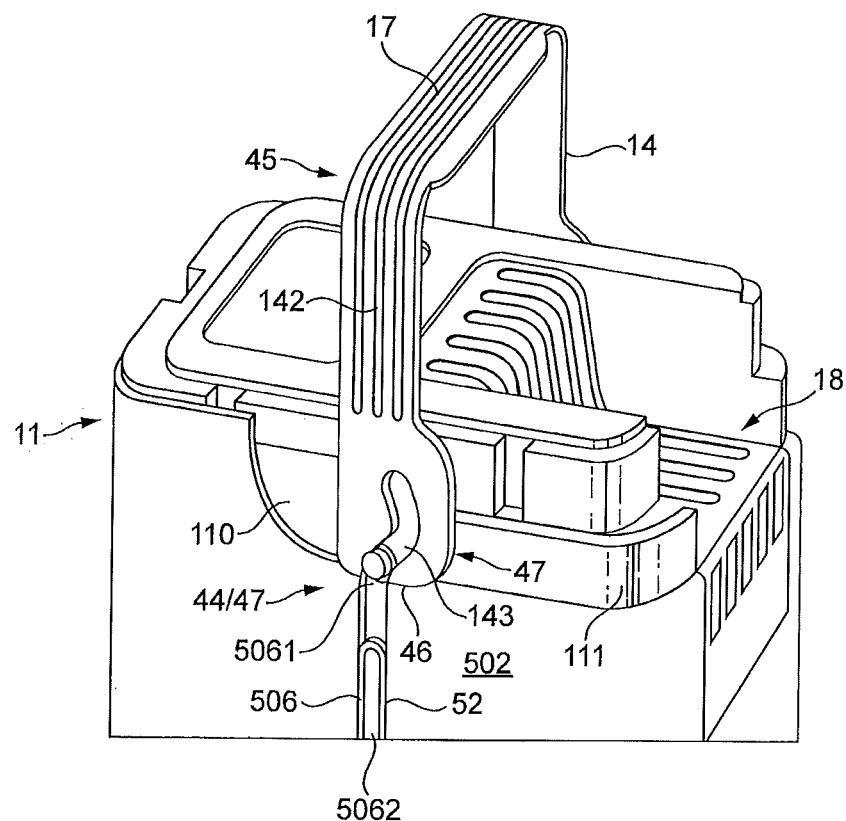
FIGS. 5A, 5B and 5C show schematic illustrations of an example fastening and/or guiding mechanism of the dock and/or container.

To that effect, and as shown in FIGS. 4B and 5A, the container guiding mechanism 48 of the actuator 45 may comprise two levers 14 provided on opposing parts of the container 2. The at least two levers 14 may be configured to operate simultaneously, for example with respect to a plane of FIG. 2A and FIG. 2B (corresponding to plane (O'-O') of FIG. 4B). The at least two levers 14 may be configured to cooperate with the guiding mechanism 47 of the dock 500. The symmetrical location and the simultaneous movement of the two levers 14 with respect to the plane of FIG. 2A and FIG. 2B may thus enable the displacement of the container 2 with respect to the dock 500 as mentioned above, with at least one of the associated advantages.

Additionally or alternatively, as illustrated in FIGS. 2A, 2B, 3A, 3B and 3C, in some examples, the fastening mechanism 44 and/or dock guiding mechanism 47 of the dock 500 may further comprise a receiver 502 for accommodating the fluid container 2 in the seated but undocked condition (FIG. 2A and FIG. 4A) and in the engaged condition (FIG. 2B and FIG. 4B).

Figure 3A:
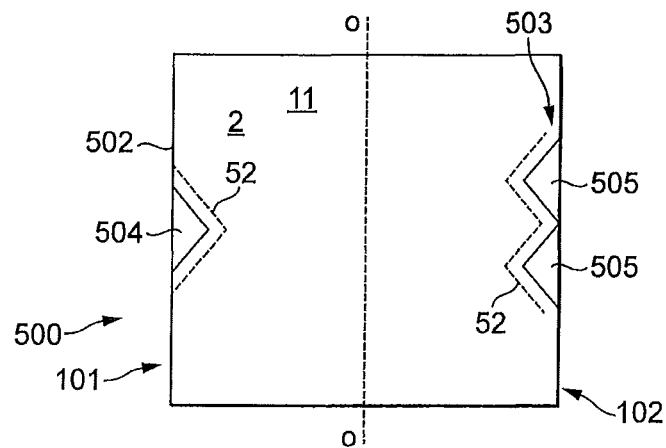
FIGS. 3A, 3B and 3C show schematic illustrations of an example engaging mechanism of the dock and/or container.
Figure 3B:
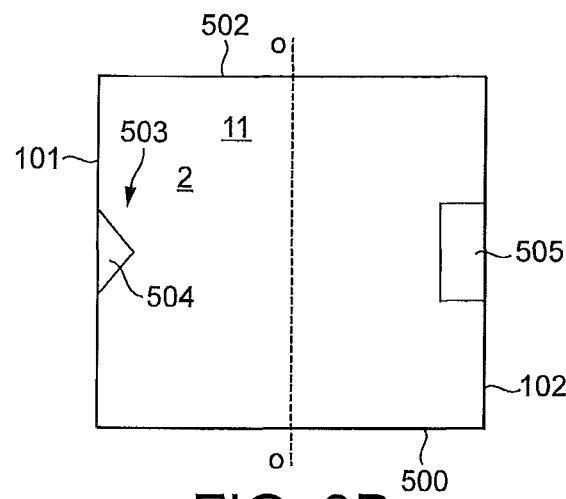
Figure 3C:
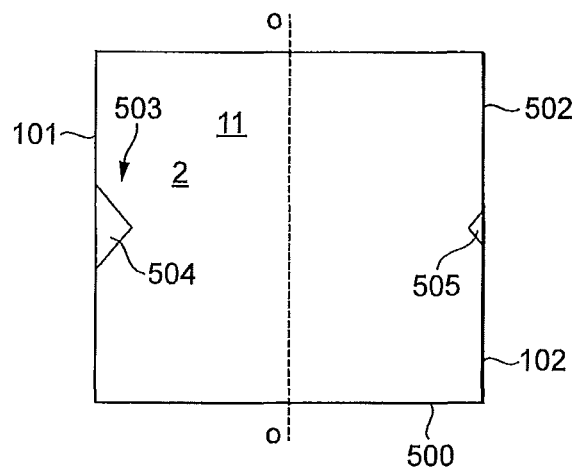

FIGS. 3A, 3B and 3C schematically illustrate in solid lines a top view of the example receiver 502, viewed toward the dock, the receiver 502 accommodating a container 2 illustrated in dotted lines. FIGS. 4A and 4B illustrate a more specific example of the receiver 502, FIG. 4A being a view in perspective of the receiver 502 and the container 2, and FIG. 4B being a view of the receiver 502 and the container 2 viewed toward the dock.

In some examples, the receiver 502 may comprise at least one wall, close to the docking interface (not shown in the FIGS. 3A, 3B and 3C and 4A, 4B), configured to cooperate with the part 10 of the container 2 and/or at least one peripheral wall, extending farther from the docking interface, configured to cooperate, at least partly, with the part 11 of the container 2. The receiver 502 may act as a guide for the container 2 and may thus enable the displacement of the container 2 with respect to the dock 500 as mentioned above, with at least one of the associated advantages.

Additionally or alternatively, the dock 500 may comprise an engaging mechanism 503, which may for example be asymmetric, configured to cooperate with an engaging mechanism 52 of the fluid container 2, which may for example be asymmetric, such that the fluid container may be guided and/or accommodated in only one spatial orientation with respect to the dock 500.

As illustrated in FIG. 3A, the asymmetric engaging mechanism 503 may comprise a first number (for example one (1)) of recesses and/or protrusions 504 provided in one part 101 of the receiver 502 and a second, different, number (for example two (2)) of recesses and/or protrusions 505 provided in another part 102 of the receiver.

Alternatively or additionally, as illustrated in FIG. 3B, the asymmetric engaging mechanism 503 may comprise at least one recess and/or protrusion 504 with a first shape (for example a triangle) provided in one part 101 of the receiver 502 and at least one recess and/or protrusion 505 with a second, different, shape (for example a rectangle) provided in another part 102 of the receiver 502.

Alternatively or additionally, as illustrated in FIG. 3C, the asymmetric engaging mechanism 503 may comprise at least one recess and/or protrusion 504 with a first dimension provided in one part of the receiver 502 and at least one recess and/or protrusion 505 with a second, different, dimension provided in another part 102 of the receiver 502. In some examples, the parts 101 and 102 may be opposing each other, in a plane parallel with respect to the plane (O-O) as shown in FIGS. 3A, 3B and 3C. Alternatively or additionally (not shown in the Figures), in some examples, the parts 101 and 102 may be opposing each other, in a plane perpendicular to the plane (O-O).

As illustrated in FIG. 4A and FIG. 4B, in some examples the engaging mechanism 503 may be tapered from the docking interface 501 of the dock 500. The engaging mechanism 52 of the container 2 may have a corresponding tapered profile. The tapered geometry may enable the engaging mechanism 503 to provide clearance c between the engaging mechanism 503 of the dock 500 and the engaging mechanism 52 of the fluid container 2. The clearance c may enable a user and/or operator to easily engage the engaging mechanism 52 of the fluid container 2 with the engaging mechanism 503 of the dock 500. This may enable easy insertion of the container 2 in the dock 500. The tapered geometry may enable the engaging mechanism 503 to guide the fluid container 2 from the seated but undocked condition into the engaged condition into the docking interface 501 in a well-defined and tight manner in the docking interface 501.

It should be understood that the engaging mechanism 503 may be tapered towards or away from the docking interface 501 of the dock 500.

It should be understood that the engaging mechanism 52 and/or the engaging mechanism 503 may prevent or at least inhibit the container 2 from being inserted in the dock 500 in an incorrect orientation with respect to the dock 500. The dock 500 may thus prevent or at least inhibit the incorrect coupling of the container 2 to the fluid circulation system 1 of the engine 50 or the vehicle 100. It should also be understood that:

the fastening mechanism 46 and/or the guiding mechanism 48 of the container may form, at least partly, part of the engaging mechanism 52; and/or the fastening mechanism 44 and/or the guiding mechanism 47 of the dock 500 may form, at least partly, part of the engaging mechanism 503.

In some examples, the actuator 45 may further comprise at least one handle 17 coupled to the one or more levers 14. As illustrated in FIG. 4B and FIG. 5A, the handle 17 may be operated by a user to cause the actuator 45 to be moved or changed from the first condition (FIG. 2A) to the second condition (FIG. 2B).

Alternatively or additionally, the handle 17 may be configured to be operated by a user to cause the actuator 45 to be moved or changed from the second condition (FIG. 2B) to the first condition (FIG. 2A).

The handle 17 may be located at an end of the actuator 45. The location of the handle 17 at the end of the actuator 45 may enable easy operation of the handle 17 by a user and/or operator.

The handle 17 may operate the two levers 14 simultaneously.

As illustrated in FIG. 4B, the handle 17 may further be configured to cover at least partly the part 11 of the fluid container 2 and/or a part of the receiver 52 of the dock 500. To that effect, the handle 17 may be placed in a recess 111 of the dock 500 as shown in FIG. 5A, when the container 2 is in the engaged condition. The covering of the part 11 of the fluid container 2 and/or the part of the receiver 52 of the dock 500 may prevent or at least inhibit accidental and/or unintentional operation of the handle 17 and thus accidental and/or unintentional extraction of the container in the engaged condition from the dock 500.

The container 2 may comprise a handling space 18 (FIG. 5A) such that a user may hold the container 2 and/or operate the handle 17 more easily.

Figure 5B:
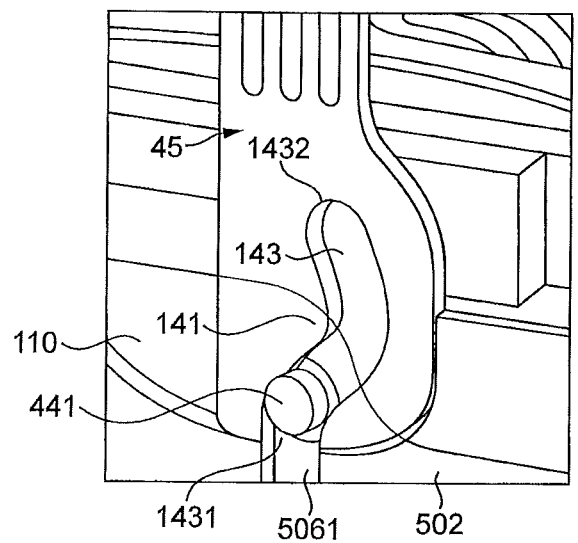

As schematically illustrated in FIGS. 5A and 5B, in the first condition, the cam 141 of the actuator 45 may be configured to abut with, the spigot 441 of the fastening mechanism. 44 of the flock 500.

In some examples, in the seated but undocked condition, the fastening mechanisms 44 and/or 46 may be further configured to hold the fluid container 2 such that the fluid port 456 of the container 2 is spaced from the docking interface 501 of the dock 500, for example by a distance d (shown in FIG. 2A).

The fastening mechanisms 44 and/or 46 may thus prevent or at least inhibit the fluid port 456 of the container 2 and/or a port 81 of the system 1 located on the dock 500 from being damaged by a shock between the container 2 and the dock 500, if the container 2 is dropped, for example accidentally, into the dock 500.

In some embodiments, the fastening mechanism 46 and the guiding mechanism 48 may, at least partly, form part of the actuator 45 and/or the fastening mechanism 44 and the guiding mechanism 47 of the dock 500 may, at least partly, form part of the receiver 502.

Figure 5C:
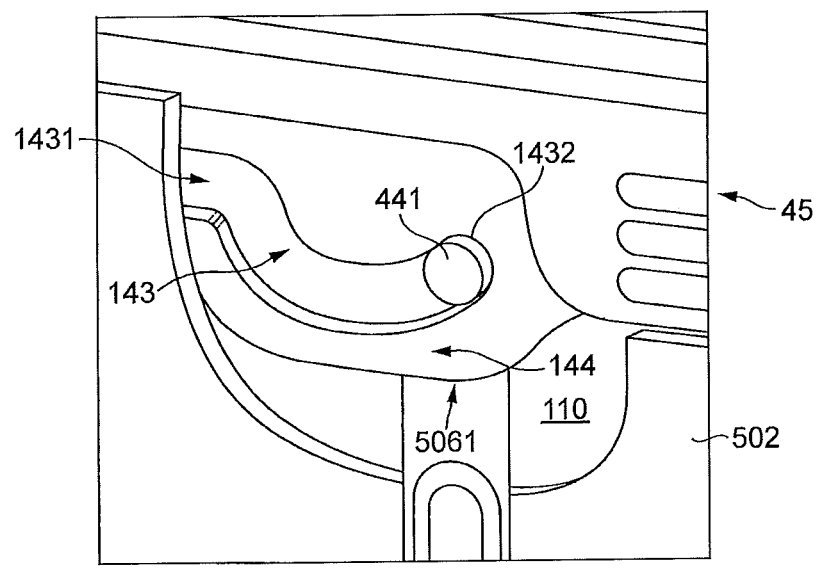

FIGS. 5A, 5B and 5C show an example of operation of an example embodiment of a container in accordance with some aspects of the disclosure.

As shown in the FIGS. 5A, 5B and 5C, the actuator 45 is U-shaped, the handle 17 forming the base of the U and the levers 14 forming the arms of the U.

The fastening mechanism 46 provided on one lever 14 comprises the mechanism groove 143 and the cam 141. The mechanism groove 143 has a curved shape, adjacent the cam 141. The cam 141 provides aside of the mechanism groove 143. Another side 144 of the mechanism groove 143 is provided on the lever 14. The mechanism groove 143 has an open end 1431 and a closed end 1432.

The actuator 45 is rotatable with respect to the body 304, between the first condition (FIG. 5A) and the second condition (FIG. 5B). To that effect, the fastening mechanism 46 may rotate in a recess 110 of the container 2, provided in the part 11 of the container 2.

The engaging mechanism 52 of the container 2 comprises at least one container groove 506 located on a wall of the container 2, extending longitudinally from the part 10 to the part 11, for example in a plane parallel to plane (O-O) and/or parallel to a longitudinal axis of the container 2. The container groove 506 has two extremities 5061 and 5062. Both extremities 5061 and 5062 of the container groove 506 are open. In the example of FIGS. 5A to 5C, the container 2 comprises two container grooves 506, located on opposite sides of the container 2.

In the first condition of the actuator 45, an extremity 5061 of the container groove 506 communicates with the open end 1431 of the mechanism groove 143.

The fastening mechanism 44 of the dock 500 comprises the at least one spigot 441, located on a wall of the receiver 502, extending from an inner wall of the receiver 502, for example in a plane parallel to plane (O-O) and/or perpendicular to a longitudinal axis of the receiver 502. In the example of FIGS. 5A to 5C, the container comprises two spigots 441, on opposite inner sides of the receiver 502.

Each of the spigots 441 is configured to slide in the respective container grooves 506 from the end 5062 to the end 5061, as the container 2 is inserted in the dock 500. When the actuator 45 is in the first condition, as shown in FIG. 5B, the spigot 441 further enters the mechanism groove 143 from the container groove 506, and then abuts with the cam 141. It should be understood that the actuator 45 is configured, in the first condition, to enable the container to be inserted into and/or held in the dock, in the seated but undocked condition. The container 2 cannot be inserted further and/or docked while the actuator 45 is in the first condition, because the cam 141 inhibits movement of the container 2 in the dock 500, and thus inhibits docking of the container to the dock.

As the actuator 45 is operated from the first condition (FIG. 5B) to the second condition (FIG. 5C) with the container in the seated but undocked condition, the mechanism groove 143 and the surface of the cam 141 slide with respect to the spigot 441. The spigot 441 is fixed with respect to the receiver 502 and the cam 141 acts against the spigot 441 to bring the fluid container 2 into the engaged condition in which the fluid container is docked with the dock (FIG. 5C). The curvature of the mechanism groove 143 may enable opening of the ports (as described in greater detail below). The curvature of the mechanism groove 143 may for example enable the container to exert a force, for example against biased springs, for example provided in the couplings 7 and/or 8.

In the second condition of the actuator 45, the spigot 441 is located in the mechanism groove 143, and for example abuts the closed extremity 1432 of the groove 143. As the spigot 441 is located in the mechanism groove 143, the side 144 inhibits the container groove 506 and the spigot 441 from sliding with respect to each other, and the container 2 is locked in the engaged condition and cannot be extracted easily from the dock 500 whilst the actuator 45 is in the second condition.

It should be understood that, if the container 2 is inserted in the dock whilst the actuator 45 is in the second condition, the side 144 inhibits the mechanism groove 143 and the spigot 441 from sliding with respect to each other. The container 2 thus cannot be inserted further in the seated whilst the actuator 45 is in the second condition.

As the actuator 45 is operated from the second condition (FIG. 5C) to the first condition (FIG. 5C) with the container in the engaged condition, the mechanism groove 143 and the surface of the cam 141 slide with respect to the spigot 441. The spigot 441 is fixed with respect to the receiver 502 and the cam 141 acts with the spigot to extract the fluid container 2 from the engaged condition in which the fluid container is docked with the dock (FIG. 5C) to the seated but undocked condition (FIG. 5B). The container 2 may thus be easily removed from the dock.

The dock 500 may be provided on a vehicle 100 (such as an engine vehicle of a carrier). One or more docks 500 may be provided on the vehicle 100.

In the case where the dock 500 is provided on a vehicle 100, the dock 500 may comprise at least one fluid port, such as the fluid port 81, comprising for example the coupling 8 adapted to connect to the optional corresponding coupling 7 on the port 456 of the fluid container 2, to connect the fluid container 2 in fluidic communication with the fluid circulation system 1 of, or associated with, the engine 50.

The dock 500 may be provided directly proximate to the engine 50, but may also be provided away from the engine 50, such as in the boot or trunk of the vehicle 100. The dock 500 may further comprise an interface 21 for data communication with, the data provider 20 of the fluid container 2.

In the case where the dock 500 is provided on a vehicle such as a carrier (such as a pallet), for recycling and/or analysing and/or servicing of the container 2, the dock 500 does not need to comprise a fluid port, but in some examples the dock may also comprise a fluid port, for example for filling and/or emptying (draining) the container 2, for example before recycling of the container and/or fluid 3. In some examples the carrier may be any carrier located on any transportation device; in a vehicle service centre; in an analysing facility; and/or in a recycling facility.

Figure 6:
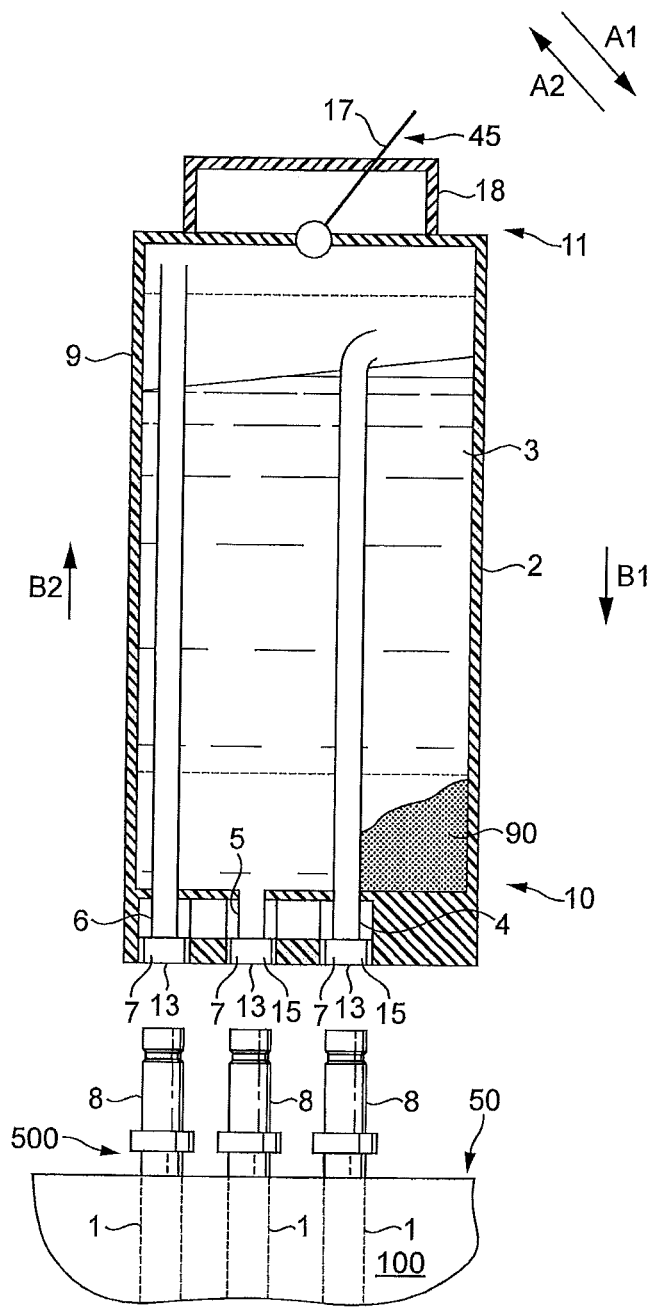
FIG. 6 represents, in schematic part cross-section, an example dock with an example container disconnected from a dock.

As illustrated in FIG. 6 the fluid container 2 may comprise a filter 90. The container 2 illustrated in FIG. 6 comprises, at the first end 10, at least one fluid outlet port 5, at least one fluid inlet port 4 and at least one vent port 6 (each of said ports 4, 5 and 6 may comprise a coupling 7, which may for example be self-sealing, adapted to connect to a corresponding coupling 8 of ports 81 on the dock 500), to connect said container 2 in fluidic communication with the engine fluid circulation system 1. In some examples, the coupling 8 may for example be self-sealing.

Figure 7:
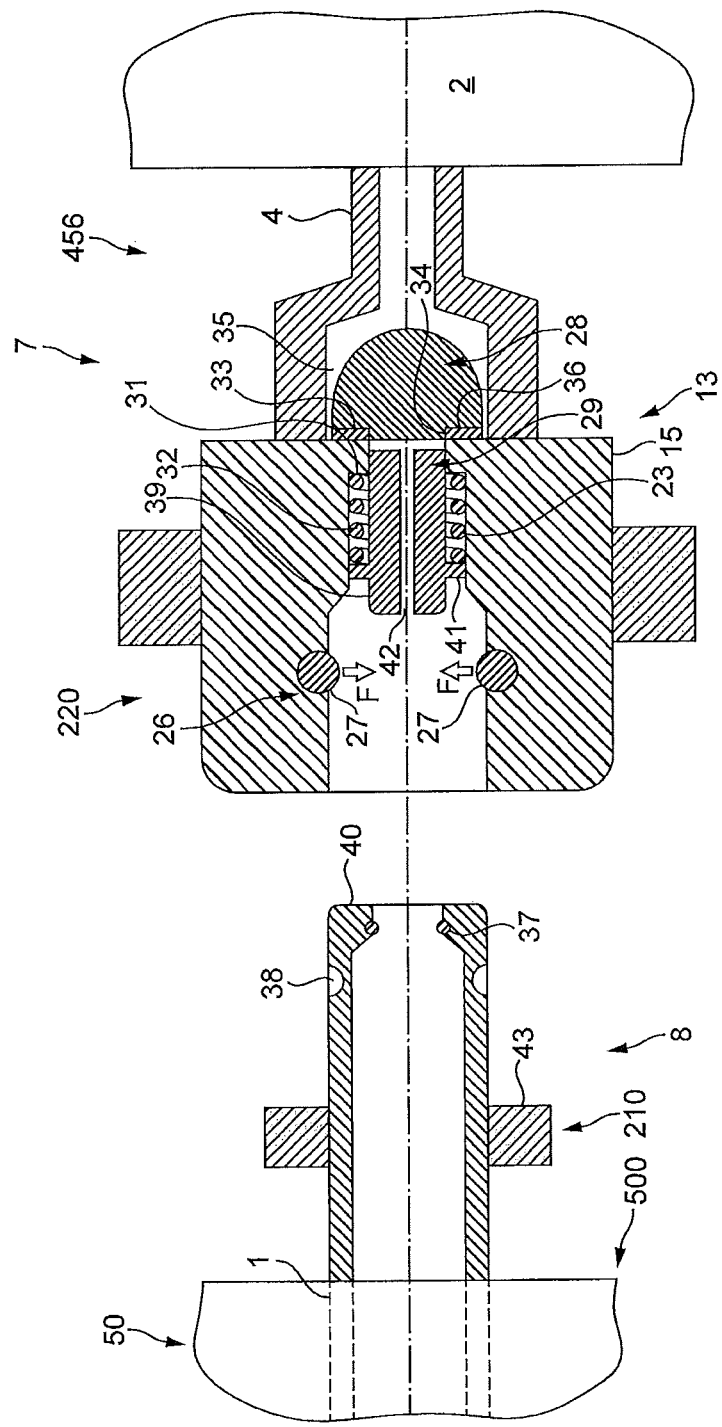
FIG. 7 represents, in schematic cross-section, an example self-sealing coupling comprising a latch.

As shown in FIGS. 6 and 7, each of said couplings 7 may comprise a latch 13 configured to be biased to a docked position to thereby retain said container 2 in fluidic communication with said vehicle engine fluid circulation system 1 when the container is docked.

Movement of the actuator 45 from the first condition to the second condition by moving the handle 17 an the direction shown generally as A1, causes the fastening mechanism 46 of the container 2 to act, via cooperation with the fastening mechanism 44, on the dock 500. The container 2 may then be connected to the dock 500 in the direction shown generally as B1.

On the contrary, movement of the actuator 45 from the second condition to the first condition by pulling on the handle 17 in the direction shown generally as A2, causes the fastening mechanism 46 of the container 2 to act, via cooperation with the fastening mechanism 44, on the dock 500 to disconnect the container 2 from the dock. The container 2 may then be removed from the dock 500 in the direction shown generally as B2.

After the disconnected container 2 has been removed from the engine 50 or vehicle 100, another container 2 which may contain fresh, refreshed or unused fluid 3 may be reconnected to the couplings 8. Thus, movement of the actuator 45 from the first condition to the second condition moves the container 2 in the direction B1 opposite to the direction B2 causes the self-sealing couplings 7 to engage and retain the container 2 with the dock 500.

In use, the container 2 is retained in fluidic communication with the vehicle engine fluid circulation system 1 by the couplings 8.

FIG. 7 shows in schematic longitudinal cross-section a non-limiting, example of a coupling 8 and a self-sealing coupling 7 comprising a latch 13 suitable for use in a dock 500 and/or a container 2 of the present disclosure.

The coupling 8 of FIG. 7 comprises a male element 210 and the coupling 7 of FIG. 7 comprises a female element 220. The female element 220 may be port of a port 456, for example an inlet port 4 (as shown) or alternatively an outlet port (not shown) or a vent port (not shown) on the container 2. The coupling 7 comprises a latch 13 comprising a collar 15.

The collar 13 has a surface 26 which exerts a radial force in the direction F on balls 27.

In some examples, the coupling 7 may comprises a self-scaling valve 28 which is biased to a closed position when the male and female elements 210 and 220 are disconnected, as shown in FIG. 7. The valve 28 comprises an axially moveable element 29 which is biased to a closed position by the action of a spring 23 noting against a face 31 on the port 4 and a face 32 on the axially moveable element 29. When in the closed position, a valve face 33 of the axially moveable element 29 bears against a valve seat 34 of the port 4 to seal a passage 35 to prevent or at least inhibit fluid flow through the valve 28. One or either or both of the valve face and valve seat may comprise a seal 36.

The male element 210 may form part of the fluid circulation system 1 of the engine 50 and comprises a sealing element 37, for example an O-ring. The male element 210 comprises an indent 38 which may be in the form of an external groove for receiving the balls 27 when engaged with the female member 220.

As the male element 210 is inserted into the female element, the sealing element 37 engages a circumferential face 39 of the axially moveable valve element 29. This sealably engages the male and female elements 210 and 220 before the valve allows any fluid to flow.

As the male element 210 is inserted further into the female element 220, an end 40 of the male element 210 engages a flange 41 (suitably circumferential) on the axially moveable valve element 29 and further insertion of the male element 210 causes the male element acting through the male element end 40 and the flange 41 to displace the axially moveable valve element 29 against the action of the biasing spring 23 and displace the valve face 33 from the valve seat 34 allowing fluid to flow through the passage 35 and through a duct 42 in the axially moveable valve element 29.

Thus, the self-sealing valve has the characteristic that when the coupling 7 and the coupling 8 are being connected, a seal is made between the connecting ports before any valves open to allow fluid to flow.

As the male element 210 is inserted still further into the female element 220, the male member acts upon the balls 27 in the opposite direction to F until it is sufficiently positioned inside the female element 220 for the balls 27 to engage the indent 38. This latches the male and female members 210 and 220 together and retains the container 2 in fluidic communication with the vehicle engine fluid circulation system 1. Positioning of the male and female members may be assisted by a flange 43 on the male member 210.

To disconnect the male and female members 210 and 220, the actuator 45 is operated in the direction A2 as illustrated in FIG. 6 which causes the collar 15 of the latch 13 to be displaced away from the male member 210. The axial movement of the collar 15 causes the balls 27 to move out of the indent 38 of the male member 210 and thereby unlatch the male member 210. Thus, displacement of the female element 220 in the direction B2 disengages the balls 27 from the recess 38. Further displacement of the female element 220 in the direction B2 allows the axially moveable valve member 29 under the action of the spring 23 to be displaced and urges the valve face 33 against the face seat 34, thereby preventing or at least inhibiting flow of fluid through the passage 35 and duct 42. This seals the valve 28 before the male and female elements 210 and 220 are disconnected and, in particular, before the seal 37 of the male, member 210 disengages the circumferential surface 39 of the axially moveable valve member 29.

The container may then be removed from the vehicle (not shown). As already mentioned and as shown in FIGS. 1A and 1B, the container 2 may comprise a data provider 20, and in some non-limiting examples, the data provider 20 may be configured to provide data about the fluid container 2. In examples the data provider 20 may be coupleable to provide the data to the control device 21, such as an engine control device, via a communication link 97 (FIG. 1B). The data provider 20 may be positioned on the container 2 so that, when the container 2 is coupled in fluidic communication with the circulation system 1 of the engine 50, the data provider 20 is also arranged to communicate the data with the control device 21, and if the container 2 is not positioned for fluidic communication with the circulation system 1, communication with the data provider 20 is inhibited.

In some examples, the data, for example data obtained from the control device 21, may further be provided to a memory. In some examples, the memory may be distributed in memories selected from a list comprising: a memory 94 of a management device (for example comprising the control device 21), a memory 104 of the data provider 20 of the container 2, and/or a memory of the dock 500 for the container 2.

The control device 21, which may be for example the engine control device, comprises a processor 96, and the memory 94 configured to store data. In examples, the processor 96 may be configured to monitor, and/or to control the operation of the engine, via communication links.

The control device 21 may be configured to obtain a signal indicating that the container 2 is coupled to the circulation system 1 and/or to obtain data from the data provider 20 via the communication link 97.

The data provider 20 of the container 2 may comprise a processor 103 arranged to receive signals from a fluid sensor 93 and/or a latch sensor 30, The processor 103 may be arranged to communicate a signal indicating that the container 2 is coupled to the dock 500, and thus to the circulation system 1, and/or to communicate the data to the control device 21 via the communication link 97. The data provider 20 may further comprise memory 104 for storing data describing the fluid 3. For example, the memory 104 may store data including at least one of the grade of the fluid, the type of fluid, the date on which the container was filled or refilled, a unique identifier of the container 2, an indication of whether the container 2 is new, or has previously been refilled or replaced, an indication of the vehicle mileage, the number of times the container 2 has been refilled or reused, and the total mileage for which the container has been used.

The engine 50 may comprise an engine communication interface 106 arranged to communicate operational parameters of the engine 50, such as engine speed and throttle position, to the processor 96 of the control device 21 via a communication link 98. The engine communication interface 106 may further be operable, to receive engine command from the control device 21 and to modify operation of the engine 50 based on the received commands.

The memory 94 of the control device 21 comprises non-volatile memory configured to store any one or a plurality of the following:
  identifiers of acceptable fluids for use in the engine 50;
  data defining first container fluid level threshold and a second fluid level threshold;
  data indicative of an expected container fluid level based on the mileage of the vehicle;
  data defining a service interval, wherein the service interval is the time period between performing maintenance operations for the vehicle such as replacing the fluid;
  the vehicle mileage;
  sets of engine configuration data for configuring the engine to operate in a selected way;
  an association (such as a look up table) associating fluid identifiers with the sets of engine configuration data; and
  data indicative of an expected fluid quality based on the mileage of the vehicle.

The processor 96 is operable to compare data stored in the memory 94 with data obtained from the data provider 21 of the container 2 and/or from the communication interface 106 of the engine 50.

The processor 103 of the container 2 may be configured to obtain data indicating the expected fluid level based on the mileage since the fluid was last refilled, and to compare too fluid level sensed by the sensor 93 with stored data. In the event that this comparison Indicates that the fluid level is changing more quickly than expected, the data provider 20 can be configured to send data to the control device 21 to modify a service interval for the vehicle based on this comparison.

Many different types and grades of fluids 3 are available and the data provider 20 may comprise an identifier of the fluid 3. Similarly, many different types and grades of filter 90 are available and the data provider 20 may additionally or alternatively comprise an identifier of the filter 90.

The data provider 20 may comprise a computer readable identifier for identifying the fluid 3. The identifier may be an electronic identifier, such as a near field RF communicator, for example a passive or active RFID (RadioFrequency Identification) tag, or an NFC (Near Field Communication) communicator.

The data provider 20 may be configured for one and/or two way communication. For example the data provider 20 may be configured only to receive data from the control device 21, so that the data can be provided to the memory 104 at the container 2. For example the memory 104 may be configured to receive data from the engine control device 21. This enables data to be stored at the container 2. Such stored data can then be provided from the memory 104 to diagnostic devices during servicing and/or during replacement of the container 2. Alternatively the data provider 20 may be configured only to provide data to the control device 21. In some possibilities, the data provider 20 is adapted to provide data to and receive data from the control device 21.

FIG. 8B shows an elevation view of a container 2 and FIG. 8A a partial section through a wall of the container 2. The container 2 comprises the body 304, and a base 306. The body 304 is secured to the base 306 by a lip 302. The data provider 20 may be carried in the lip 302. The base 306 is configured to be docked to the dock 500.

The lip 302 may include a data coupling 310 to enable the data provider 20 to be coupled to an interface 99 for communicating data with the control device (not shown in FIGS. 8A and 8B). The interface 99 may comprise connectors 314 for connecting the interface 99 with the data provider 20 of the container 2.

The base 306 of the container 2 may comprise a fluid coupling (not shown in FIGS. 8A and 8B) for coupling fluid from the reservoir 9 of the container 2 with the circulation system 1 of the engine 50. The fluid coupling and the data coupling 310 are arranged so that connecting the fluid coupling in fluidic communication with the circulation system 1 of the engine 50 also couples the data provider 29 for date communication with the control device 21 via the interface 99 by seating the connectors 314 of the interface 99 in the data coupling 310 on the container 2.

In some examples, the interface 99 and the connectors 314 may provide electrical connections for up to e.g. eight (8) channels which provide measurements for fluid temperature, fluid pressure, fluid quality, fluid type, and the level (e.g. amount) of fluid in the container 2. The connectors 314 may be arranged to provide electrical power to the data provider 20.

As shown in FIGS. 9A and 9B, the profile of data couplings 310 is configured to protect communications interface and/or communication pads.

The control device 21 may be configured to prevent the engine 50 from operating if the container 2 is disconnected from the engine fluid circulation system 1 and/or the fastening mechanism and/or guiding mechanisms may be configured to prevent the container 2 from being disconnected from the engine 50 if the engine is operating.

As already discussed, at least one of the ports 4, 5 or 6 may comprise a non-return valve. Suitably, the at least one outlet port 5 comprises a non-return valve. If the container comprises more than one outlet port, suitably each outlet port comprises a non-return valve. The non-return valve in the outlet may prevent or at least inhibit fluid from draining back to the container 2 when the engine 50 is not operating and may help keep a fluid line to a circulating pump full of fluid so that circulation of fluid is immediate when operation of the engine is started.

The fluid inlet port or ports 4 may each comprise a control valve or shut-off valve which may be closed when the vehicle engine is not operating, for example to prevent or reduce fluid draining from the container 2 to the engine 50.

The vent port 6 may not contain any valves because fluid, for example gas and/or vapour, may be required to flow both to and from the container through the vent port 6 when the container is connected to the vehicle engine fluid circulation system 1.

As mentioned, the container 2 may comprise a filter 90 for filtering the fluid 3, for example when the fluid is an engine lubricating oil. Suitable filters 90 may comprise paper and/or metal filter elements. The filter 90 may be suitable for filtering particles in the range 1 to 100 microns, suitably in the range 2 to 50 microns, for example in the range 3 to 20 microns. The filter 90 may comprise a filter by-pass for fluid to bypass the filter, for example if the filter 90 becomes blocked or unacceptably loaded with material, which may cause an unacceptable fluid back-pressure through the filter 90. An advantage of having a filter 90 in the container 2 is that this may allow a larger filter to be used than if the filter were in a separate container associated with the engine fluid circulation system 1. This may have one or more of the following benefits: (a) increased filtration efficiency; (b) finer filtration and (c) increased filter lifetime. Suitably, in use, fluid enters the container 1 through the inlet port 4 and is passed to the top of the container 2, for example through at least one conduit in the container 2; some or all of the fluid 3 is passed through the filter 90 on exiting said conduit; and the totally or partially filtered fluid is withdrawn from the base of too container through the outlet port 5. The filter 90 may operate at elevated pressure.

The container 2 may be manufactured from metal and/or plastics material. Suitable materials include reinforced thermoplastics material which for example, may be suitable for operation at temperatures of up to 150° C. for extended periods of time.

The container 2 may comprise at least one trade mark, logo, product information, advertising information, other distinguishing feature or combination thereof. The container 2 may be printed and/or labelled with at least one trade mark, logo, product information, advertising information, other distinguishing feature or combination thereof. This may have an advantage of deterring counterfeiting. The container 2 may be of a single colour or multi-coloured. The trademark, logo or other distinguishing feature may be of the same colour and/or material as the rest of the container or a different colour and/or material as the rest of the container.

In some examples, the container 2 may be provided with packaging, such as a box or a pallet. In some examples, the packaging may be provided for a plurality of containers, and in some examples a box and/or a pallet may be provided for a plurality of containers.

The container 2 may be a container 2 for a fluid which is a liquid. As already mentioned, suitable liquids include engine lubricating, oil and heat exchange fluid for an electric engine.

The container 2 may be a container for an engine lubricating oil. Thus, the container may contain engine lubricating oil. In this embodiment, the container 2 may be provided as a self-contained container containing flesh, refreshed or unused lubricating oil which may easily replace a container (on a dock 500) which is empty or contains used or spent lubricating oil. If the container 2 also comprises the filter 90, this also is replaced together with the spent or used lubricating oil. Thus, a fluid reservoir container containing spent or used lubricating oil retained in fluidic communication with the vehicle engine fluid circulation system 1 may be disconnected from the vehicle engine fluid circulation system, removed from the vehicle and replaced by a container containing fresh, refreshed or unused lubricating oil and if present a fresh, renewed or new filter.

In some examples, a part of the container 2 (for example the part 10 comprising the ports and/or the filter) may be separated from the part 11, and anew part 10 may be attached to the part 11. The part 11 may thus be re-used.

The container may be at least partly recyclable and/or re-useable. In some examples, the part 10 and/or part 11 of the container may be recycled and/or re-used.

The engine lubricating oil may comprise at least one base stock and at least one engine lubricating oil additive. Suitable base stocks include bio-derived base stocks, mineral oil derived base stocks, synthetic base stocks and semi synthetic base stocks. Suitable engine lubricating oil additives are known in the art. The additives may be organic and/or inorganic compounds. Typically, the engine lubricating oil may comprise about 60 to 90% by weight in total of base stocks and about 40 to 10% by weight additives. The engine lubricating oil may be a lubricating oil for an internal combustion engine. The engine lubricating oil may be a mono-viscosity grade or a multi-viscosity grade engine lubricating oil. The engine lubricating oil may be a single purpose lubricating oil or a multi-purpose lubricating oil.

The engine lubricating oil may be a lubricating oil for an internal combustion engine. The engine lubricating oil may be lubricating oil for a spark ignition internal combustion engine. The engine lubricating oil may be a lubricating oil for a compression internal combustion engine.

The container may be a container for heat exchange fluid for an electric engine. Thus, the container may contain heat exchange fluid for an electric engine. In such a case, the container may be provided as a self-contained container containing fresh, refreshed or unused heat exchange fluid, for an electric engine which may easily replace a container (on an dock) which can be empty or can contain used or spent heat exchange fluid. If the container also comprises a filter, this also is replaced together with the spent or used heat exchange fluid.

Electric engines may require heat exchange fluid to heat the engine and/or cool the engine. This may depend upon the operating cycle of the engine. Electric engines may also require a reservoir of eat exchange fluid. The fluid reservoir container may provide a heat storage container in which heat exchange fluid may be stored for use to heat the electric engine when required. The fluid reservoir container may provide a container for storage of coolant at a temperature below the operating temperature of the engine for use to cool the electric engine when required.

Suitable heat exchange fluids for electric engines, which may have additional functionality (such as the primary function) which may include for example charge conduction and/or electrical connectivity, may be aqueous or non-aqueous fluids. Suitable heat exchange fluids for electric engines may comprise organic and/or non-organic performance boosting additives. Suitable heat exchange fluids may be man-made or bio-derived, for example Betaine. The heat exchange fluids may have fire retarding characteristics and/or hydraulic characteristics. Suitable heat exchange fluids include phase change fluids. Suitable heat exchange fluids include molten metals or salts. Suitable heat exchange fluids include nanofluids. Nanofluids comprise nanoparticles suspended in a base fluid, which may be solid, liquid or gas. Suitable heat exchange fluids include gases and liquids. Suitable heat exchange fluids include liquefied gases.

The engine 50 may be any type of engine for example for a vehicle and/or may also be a reverse engine, such as a generator, such as a wind turbine generator.

The container may be suitable for operating at temperatures of from ambient temperature up to 200° C., suitably from −40° C. to 180° C., for example from −10° C. to 150° C.

The container may be suitable for operating at gauge pressures up to 15 bar (unit of gauge pressure, 1 Pa=$10^{-5}$ bar), suitably from −0.5 bar to 10 bar, for example from 0 bar to 8 bar.

Suitable vehicles include motorcycles, earthmoving vehicles, mining vehicles, heavy duty vehicles and passenger ears. Powered water-borne vessels are also envisaged as vehicles, including yachts, motor boats (for example with an outboard motor), pleasure craft, jet-skis and fishing vessels. Also envisaged, therefore, are vehicles comprising a system of the present disclosure, or having been subject to a method of the present disclosure, in addition to methods of transportation comprising the step of driving such a vehicle and uses of such a vehicle for transportation.

The fluid reservoir container is advantageous where rapid replacement of the fluid is required or advantageous, for example in "off-road" and/or "in field" services.

Although the example shown in FIGS. 8A, 8B, 9A, 9B comprises conductive electrical connections 314 for communicating with the data provider 20, a contactless connection may also be used. For example, inductive or capacitive coupling can be used to provide contactless communication. One example of inductive coupling is provided by RFID, however other near field communications technology may also be used. Such couplings may enable electrical power to be transferred to the data provider 20, and also have the advantage that the data connection does not require any complex mechanical arrangement and the presence of dirt or grease on the couplings 310, 314 is less likely to inhibit communication with the data provider 20.

The container 2 may comprise a power provider such as a battery for providing electrical power to the data provider 20. This may enable the container 2 to be provided with a range of sensors, including sensors for fluid temperature, pressure and electrical conductivity. Where the container 2 comprises a filter, sensors may be arranged to sense these parameters of the fluid as the fluid flows into the filter, and after the fluid has flowed through the filter.

The function of the processors 103, 96 may be provided by any appropriate controller, for example by analogue and/or digital logic, field programmable gate arrays, FPGA, application specific integrated circuits, ASIC, a digital signal processor, DSP, or by software loaded into a programmable general purpose processor.

Aspects of the disclosure provide computer program products, and tangible non-transitory media storing instructions to program a processor to perform any one or more of the methods described herein.

The memory 104 is optional. The computer readable identifier may be an optical identifier, such as a barcode, for example a two-dimensional barcode, or a colour coded marker, or optical identifier on the container 2. The computer readable identifier, may be provided by a shape or configuration of the container 2. Regardless of how it is provided, the identifier may be encrypted.

The communication links 97 and/or 98 may be any wired or wireless communication link, and may comprise an optical link.

Although circulated fluid is described as being returned to the fluid container 2 for circulation, in the context of too present disclosure, those skilled in the art will appreciate that circulated fluid could be expelled (as is the case for de-icer) and/or collected and/or stored in a container coupled to the engine 50 and, when convenient, emptied from or otherwise removed, e.g., from the vehicle 100.

Other variations and modifications of the apparatus will be apparent to persons of skill in the art in the context of the present disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or many combination with any other reference or references, teaches, suggests of discloses any such invention. Further, to the extent that any meaning or definition of a term in this document conflicts with any meaning or definition of the same term m a document incorporated by reference, the meaning or definition assigned to that terra in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A replaceable fluid container for an engine or a vehicle, comprising:
    a fluid reservoir;
    at least one fluid port adapted to couple with a fluid circulation system associated with an engine; and
    an actuator, configured to be operated between a first condition and a second condition,
    wherein the actuator is configured, in the first condition, to
        enable the fluid container to be inserted into and/or held in a dock, in a seated but undocked condition, and inhibit docking of the fluid container to the dock; and wherein the actuator is further configured, when operated from the first condition to the second condition with the fluid container being in the seated but unlocked condition, to enable the fluid container to dock in an engaged condition with the dock;

wherein when the actuator is operated from the first condition to the second condition, the actuator is rotated about an axis perpendicular to a direction that the fluid container moves when traveling from the undocked condition to the engaged condition with the dock; and wherein the at least one fluid port comprises a coupling adapted to connect to a corresponding coupling of the fluid circulation system;

such that when the couplings are being connected, a seal is made between the couplings before any valves open to allow fluid to flow.

2. The container of claim 1, wherein the actuator is further configured, as the actuator is operated from the first condition to the second condition; to insert the fluid container further into the dock to bring the fluid container into the engaged condition.

3. The container of claim 1, wherein the actuator is further configured, as the actuator is operated from the second condition to the first condition with the fluid container in the engaged condition, to extract the fluid container from the dock to take the fluid container from the engaged condition into the seated but undocked condition.

4. The container of claim 1, wherein the actuator comprises a fastening mechanism configured to cooperate with a fastening mechanism of the dock, the actuator being configured such that:

in the first condition, the fastening mechanism of the actuator is configured to abut with the fastening mechanism of the dock to hold the fluid container such that the fluid container is in the seated but undocked condition; and in the second condition, the fastening mechanism of the actuator is fastened to the fastening mechanism of the dock and the fluid container is docked in the engaged condition with the dock.

5. The container of claim 4, wherein:
the actuator comprises at least one lever;
the fastening mechanism of the dock comprising a lever-engaging surface configured to cooperate with the lever.

6. The container claim 1, wherein the actuator is configured to guide the fluid container from the seated but undocked condition to the engaged condition in a direction which is normal to the fluid port and which defines, in use, a direction of flow of fluid in the fluid container.

7. The container of claim 1, wherein the actuator is configured to guide the fluid container from the engaged condition to the seated but undocked condition in a direction which is normal to the fluid port and which defines, in use, a direction of flow of fluid in the fluid container.

8. The container of claim 5, wherein the actuator comprises:
a handle coupled to the lever and configured to be operated by a user, to cause the actuator to be operated from the first condition to the second condition.

9. The container of claim 8, wherein the handle is further configured to be operated by a user, to cause the actuator to be operated from the second condition to the first condition.

10. The container of claim 8, wherein the handle is further configured to cover at least partly or extend over a part of the fluid container when the fluid container is in the engaged condition.

11. The container of claim 4, wherein, in the first condition, the actuator is configured to abut, at a part of the fluid container remote from the fluid port, with the fastening mechanism of the dock.

12. The container claim 1, further comprising:
a body configured to cooperate with a receiver of the dock, the receiver being configured to accommodate the fluid container in the undocked condition and in the engaged condition.

13. The container of claim 12, wherein the body comprises:
at least one container asymmetric engaging mechanism configured to cooperate with at least one receiver asymmetric engaging mechanism of the receiver, such that the fluid container may be seated but undocked in only one spatial orientation with respect to the dock.

14. The container of claim 13, wherein the at least one container asymmetric engaging mechanism comprises:
a first number of recesses and/or protrusions provided in one part of the body; and
a second, different, number of recesses and/or protrusions provided in another part of the body.

15. The container of claim 13, wherein the at least one container asymmetric engaging mechanism comprises:
at least one recess and/or protrusion with a first shape provided in one part of the body; and
at least one recess and/or protrusion with a second, different, shape provided in another part of the body.

16. The container of claim 13, wherein the at least one container asymmetric engaging mechanism comprises:
at least one recess and/or protrusion with a first dimension provided in one part of the body; and
at least one recess and/or protrusion with a second, different, dimension provided in another part of the body.

17. The container of claim 13, wherein the at least one container asymmetric engaging mechanism is tapered, such that the container asymmetric engaging mechanism is configured to:
provide clearance between the container asymmetric engaging mechanism and the receiver asymmetric engaging mechanism, for enabling a user to engage the receiver asymmetric engaging mechanism with the container asymmetric engaging mechanism; and to
guide the fluid container from the seated but undocked condition into the engaged condition.

18. The container of claim 1, further comprising:
a data provider arranged for data communication with a control device when the fluid container is in the engaged condition.

19. The container of claim 1, wherein, in the first condition, the actuator is configured to hold the fluid container such that, in the seated but undocked condition, the fluid container is spaced from a docking interface of the dock.

20. The container claim 1, wherein, in the second condition, the actuator is further configured to:
enable the container to be inserted into the dock, whilst inhibiting the container from being in the seated but undocked condition, such that the fluid container is spaced from a docking interface of the dock.

21. The container of claim 1, further comprising:
a guiding mechanism configured to guide the fluid container from the seated but undocked condition to engaged condition.

22. The container of claim 1, wherein the reservoir holds a lubricant for a lubricant circulation system of the engine.

23. The fluid container of claim 1, wherein, when in the first condition, the actuator is in an upright position such that a user inserts or removes the fluid container from the dock using the actuator as a handle, and further wherein, when in the second condition, the actuator is positioned in a second position perpendicular to the upright position.

24. The fluid container of claim 1, wherein the at least one fluid port is located at a first end of the fluid container, wherein the actuator is located at a second end of the fluid container that is opposite the first end of the fluid container.

\* \* \* \* \*